United States Patent Office
3,733,232
Patented May 15, 1973

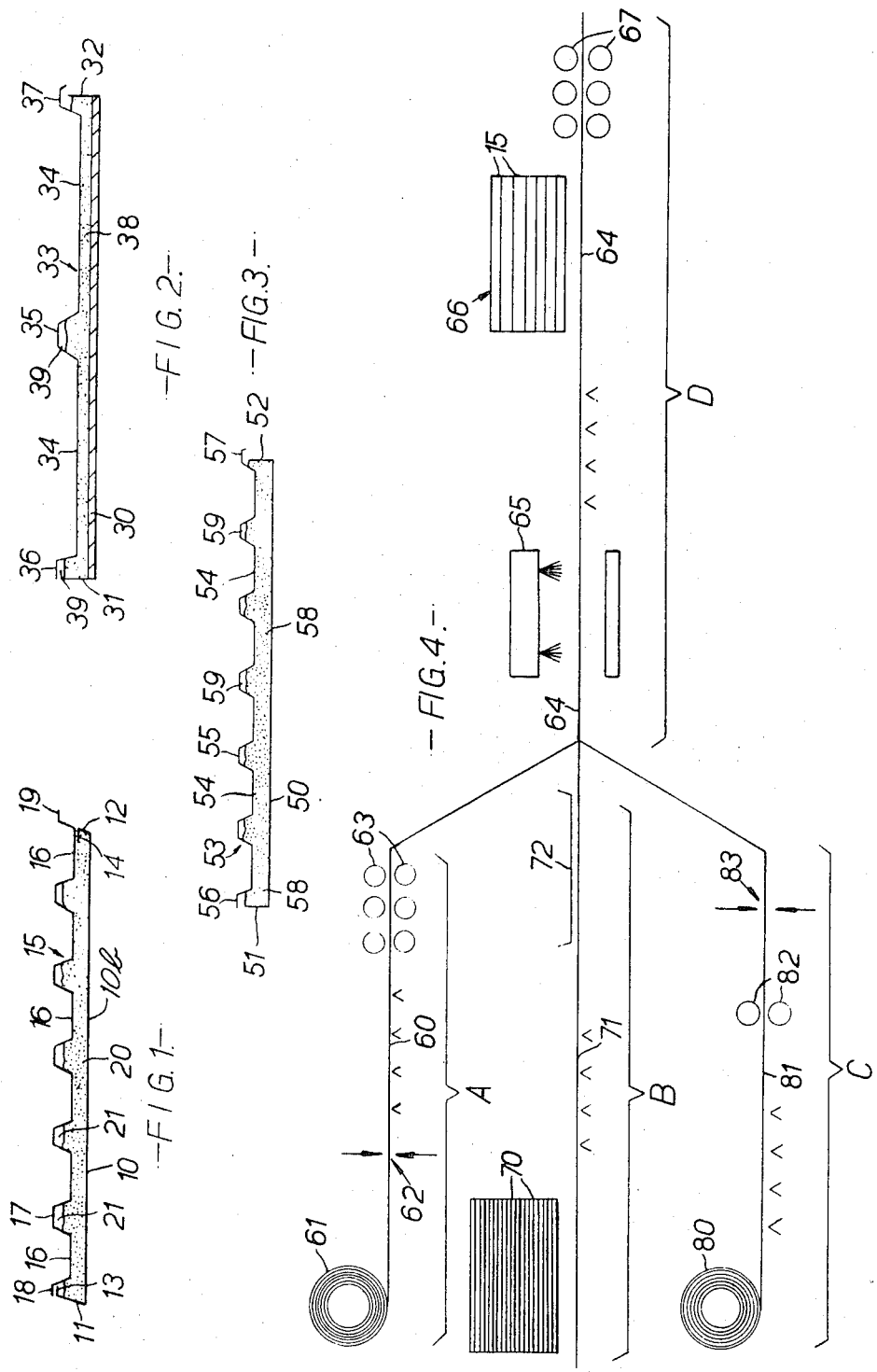

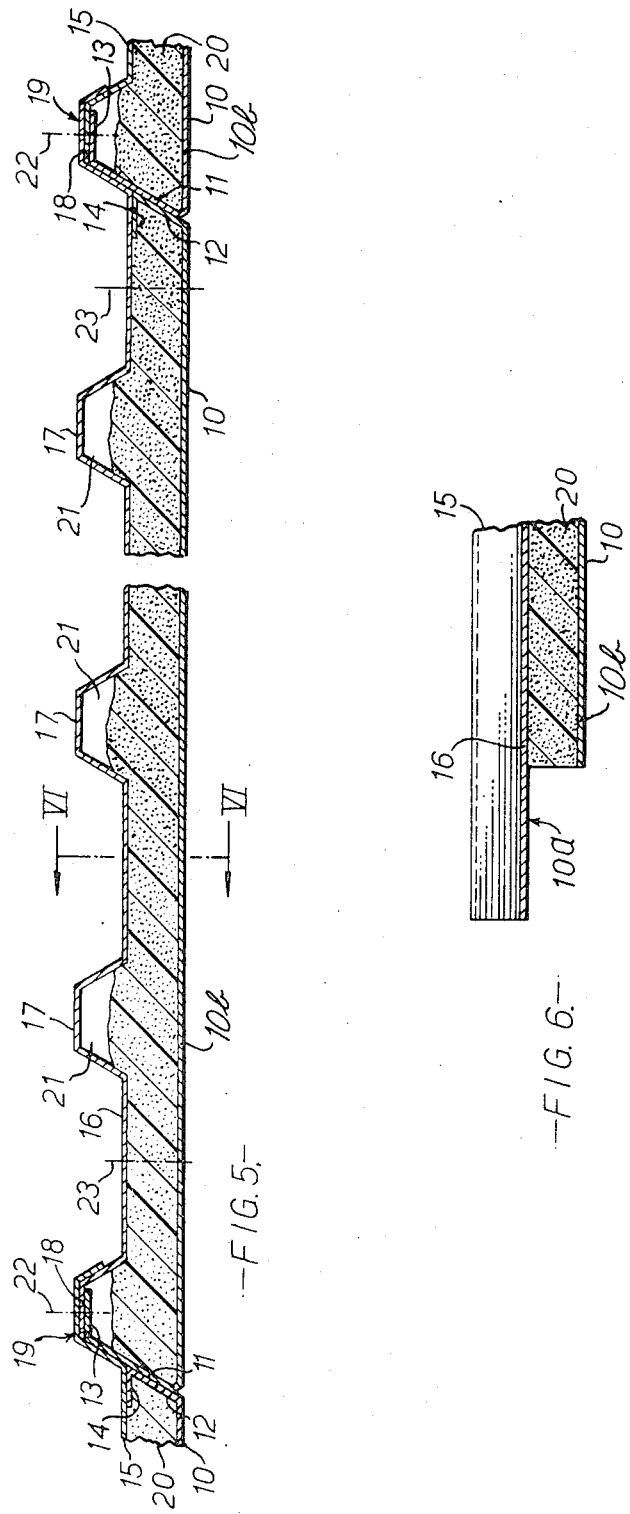

3,733,232
METHOD FOR MAKING BUILDING SHEATHING ELEMENTS
Harold J. W. Payne, Raby Mere, England, assignor to H. H. Robertson Company, Pittsburgh, Pa.
Filed Oct. 10, 1967, Ser. No. 674,317
Claims priority, application Great Britain, Feb. 2, 1967, 5,074/67
Int. Cl. B32b 5/18; E04b 2/28; E04c 1/00
U.S. Cl. 156—79      1 Claim

ABSTRACT OF THE DISCLOSURE

A prefabricated, insulated building panel formed from an inner liner sheet and a fluted outer facing sheet with side edges of both sheets engaged to allow overlapping connection of the assembled panels in side-by-side relation on a building outer surface. The panels contain foamed-in-situ insulation which serves as thermal and sound insulation and serves to rigidify the panel. The foamed-in-situ insulation may fill less than all of the volume of the fluted outer facing sheet.

BACKGROUND OF THE INVENTION

(1) Field of invention

This invention relates to composite building sheets, and more particularly, although not exclusively, sheathing elements as employed in cladding the roofs and walls of industrial and like buildings, and has for its primary object to provide improved composite building sheets and an improved method of manufacture therefor which will enable such elements or sheets to be produced by means of a continuous or substantially continuous process, thereby to substantially reduce the cost of manufacture. A further object is to provide a method of manufacture which will be of increased flexibility in so far as a wide variety of base or backing materials, e.g. sheet steel, plasterboard, asbestos felt, or the like, may be combined with outer facing sheets of metal or other suitable material by means of a foamed or expanded plastics core, without or with a minimum of, modification of the production line.

(2) Description of the prior art

Shop assembled building panels with inner and outer sheets have been proposed having interlocking side-to-side junctions. Building sheathing has been proposed using abutting liner sections connected on the building site to fluted facing sheets. Shop assembled building panels with inner and outer sheets have been proposed having interior transverse subgirts to connect inner and outer sheets.

Various methods of producing prefabricated building sheathing panels of the type described have been suggested. In one method, a foamed plastics composition, in a liquid state, is introduced between continuous ribbons of various materials while the ribbons are moved at a predetermined speed. In another method, two sheets are supported by a jig in clamped, spaced-apart relation and a foamed plastics composition, in a liquid state, is introduced therebetween and allowed to expand.

SUMMARY OF THE INVENTION

This invention provides a prefabricated building sheathing panel having an inner liner sheet and an outer fluted facing sheet wherein the two sheets are engaged along their side edges.

Broadly, according to the invention, a composite building sheet basically comprises a first sheet, e.g. a facing sheet, a second sheet, e.g. a backing sheet, and bonded therebetween a layer or core of a foamed plastics material, for example foamed polyurethane. The method of manufacturing such a composite building sheet comprises forming a first sheet of suitable material to required shape, depositing a quantity of a pre-activated foaming plastics composition onto the said sheet, applying a second sheet thereto whilst the foaming action is taking place, and holding the assembly by jig or clamp or other confining means until the foaming process is complete. Preferably provision is made for relieving the pressures developed during the foaming process, and this may comprise profiling or shaping one or both of said sheets so as to provide at least one expansion space which remains unfilled by the foamed plastics core, or by perforating said sheet or sheets at a selected point or points, thereby to provide a pressure relieving means.

Thus arranged jig or clamp means of relatively light construction may be employed to hold the assembly during the foaming process.

The resultant composite sheet or panel is light and strong and capable of spanning distances and supporting loads far in excess of the capabilities of the individual constituents.

The means for carrying out the above method of manufacture may comprise a conveyor or conveyors for progressing first, e.g. base or backing, sheets from a bulk supply, e.g. a roll or stack, to (a) cutting or/and forming and shaping means, (b) a spraying station whereat an activated foamed plastics composition is sprayed thereon, (c) a panel assembly station whereat the second, e.g. facing, sheets are applied over and to the foaming plastics composition, and (d) a station whereat the two panel sheets are retained by jig or clamp or other confining means whilst the foaming process is completed and the two sheets become firmly bonded by the foamed core. Stations (c) and (d) may if desired be combined.

Further, according to the invention, and in one mode of embodiment, a sheathing element for the purpose specified comprises a facing sheet, a backing sheet, and bonded therebetween a layer of rigid foamed plastics material, e.g. polyurethane; said backing sheet being in the form of a shallow, generally channel-shaped member, and said facing sheet being of corrugated profile. Preferably, but not essentially, the flutes or channels of the facing sheet extend in the same direction as the side walls of the backing sheet. The upper edges of the side walls of said backing sheet may be turned both in the same direction to form flanges one of which extends inwardly of the trough of said channel and the other outwardly thereof, and the corrugated facing sheet may have terminal side edges which overlie said flanges. Preferably, one end of said facing sheet is arranged so as to extend beyond the adjacent ends of the rigid foamed core and said backing sheet. Thus constructed, said sheathing element may be assembled in overlapped weather-proof relationship.

BRIEF DESCRIPTION OF THE DRAWING

The invention is further described with the aid of the accompanying drawings which illustrate schematically and by way of example only several modes of embodiment.

In said drawings:

FIGS. 1, 2 and 3 are cross-sectional views of three typical composite building sheets manufactured in accordance with the invention.

FIG. 4 is a diagram illustrating a combined production line for manufacturing composite building sheets as illustrated in FIGS 1 to 3.

FIG. 5 is a cross-sectional view of a building sheet, similar to that of FIG. 1, drawn to an enlarged scale as compared with said figure, and assembled with fellow side sheets.

FIG. 6 is a fragmentary sectional view taken as on line VI—VI of FIG. 5.

DESCRIPTION OF THE PREFERRED EMBODIMENTS

Referring first to FIGS. 1, 5 and 6, these illustrate a composite building sheet comprising a sheet metal base or backing element 10 having a tension flange or web 10b and side walls 11, 12. Said side walls, which may or may not extend normal to the tension flange or web 10b, are formed with flanges 13, 14 which extend both in the same direction as shown parallel or substantially so to the flange or web 10b. Said sheet may be composed of any suitable material, e.g. mild steel sheeting treated so as to be resistant to corrosion or a non-ferrous metal or metal alloy.

The second or facing sheet, generally designated by the numeral 15, is of protected metal or other suitable material, formed with corrugations which provide a series of longitudinally extending troughs 16 and upstanding ridges 17 defining expansion spaces 21. Said sheet 15 terminates at one edge with a flange 18 overlying the flange 13 of the backing sheet 10 and a flange 19 which extends beyond the other flange 14 of said backing sheet. Between the two sheets 10 and 15 is a layer or core 20 of a rigid foamed plastics material, e.g. foamed polyurethane, and it is to be noted that the expansion spaces 21 below the ridges 17 of the facing sheet 15 are not entirely filled with said foamed plastics. The said expansion spaces 21 function during manufacture of the sheet as expansion chambers which permit a substantially free rise and flow of the foam 20 and relieve to a great extent the pressures developed during its generation.

The facing sheet 15 extends beyond the sheet 10 and core 20 at one end, e.g. as at 10a in FIG. 6, thereby to provide for an overlapping assembly in endwise relationship of the facing sheet 15 with the facing sheet of adjacent fellow composite building sheets according to the invention.

Adjacent laterally disposed building sheets may be assembled and connected in overlapped relationship by fastening means, e.g. screws or bolts, inserted through their overlapped flange parts at the points indicated by the numerals 22 in FIG. 5. The building sheets may be secured to a supporting structure by fastening means passed therethrough at points such as indicated at 23.

Referring now to FIG. 2, the backing sheet 30 in this instance is constituted by a sheet of more or less conventional plasterboard, and jig means are provided each side during the foaming of the core to form flat sides 31, 32. The facing sheet 33 is of non-corrosive, e.g. protected, metal, but in this instance is formed with two wide troughs 34 and a single centrally disposed upstanding ridge 35 defining expansion spaces 39. Said facing sheet terminates at one side with a flange 36 flush with the side 31, and at the other side with a flange 37 which extends a short distance beyond the side 32. A foamed plastics core 38 fills the space between the sheets, effectively bonding same together, with the exception of the expansion spaces 39 which function to reduce the pressures developed during manufacture.

FIG. 3 illustrates a composite sheet comprising a backing sheet 50 of asbestos felt the edges whereof have been formed upwardly so as to provide side walls 51, 52. The facing sheet 53 is of profiled metal formed with troughs 54 and upstanding ridges 55 defining expansion spaces 59. At one terminal edge said facing sheet 53 has a flange 56 terminating flush with the side wall 51 of the backing sheet 50 and the other edge terminates with a flange 57 which overlies and extends beyond the side wall 52. The space between the sheets 50, 53 is filled with a foamed plastics core 58 except for the expansion spaces 59 below the ridges 55 which function as pressure relieving means during manufacture.

Composite building sheets of the kind as illustrated in FIGS. 2 and 3 may be assembled in overlapped relationship in a manner similar to that described with reference to FIGS. 1, 5 and 6, to provide a strong and durable weatherproof sheathing for a building.

Referring now to FIG. 4, this illustrates diagrammatically a production flow-line arranged so as to produce in a continuous or a substantially continuous, manner composite building sheets of the kind described in relation to FIGS. 1, 2, 3, 5 and 6 of the drawings. The production line is depicted as comprising in this instance three subsidiary streams or feeder lines A, B and C and a main stream D.

The stream A comprises a conveyor 60 onto which sheet metal, e.g. sheet steel, is fed from a supply coil 61, a guillotine 62 and roll forming means or apparatus 63 adapted to form a web 10b, side walls 11, 12 and flanges 13, 14 as shown in FIG. 1, and in FIGS. 5 and 6, on lengths of steel cut from the supply coil 61, by the guillotine 62 and thereby produce first panel sheets. From the forming means 63, each first panel sheet is fed as by means of a transverse conveyor onto a main conveyor or conveyors 64 below spraying means 65 arranged so as to apply to the top surface of each first panel sheet a pre-determined quantity of an activated foaming plastics composition, for example polyurethane. Whilst the foaming process is occurring, a second panel sheet as 15 (FIG. 1) is placed thereon at the panel assembly station 66 and the assembly is progressed into operative association with jigging rolls 67. The jigging rolls 67 secure the second panel sheet to the first panel sheet with the foaming plastics composition between the two panel sheets and whilst the plastic composition is actively foaming. The jigging rolls are arranged so as to be displaceable into and out of operative position and to retain the first and second panel sheets in accurately located juxtaposition until the plastics composition engages the second sheet and essentially ceases its active foaming, whereby the two panel sheets 10 and 15 have become bonded integrally by the intervening core or layer of rigid foamed plastics 20.

The aforesaid "pre-determined quantity of an activated foaming plastics composition" applied to the first panel sheet may be further defined as that amount of said foaming plastics composition which is less than the amount required to fill all of the space between the inner surfaces the first and second panel sheets, whereby the inner surface of the second panel sheet engages the foamed plastics composition over its entire area except for a portion of that inner surface of the second panel sheet which defines the expansion space 21 of FIGS. 1 and 5, for example.

The rate of movement of the conveyor or conveyors 64 may be varied as desired between the different work stations so as to suit the operation being effected. For example, the rate of movement of the backing sheets through the station 65 may be relatively fast as compared with the rate of movement through station 66.

Stream B is adapted to handle backing sheets of conventional plasterboard (as 30 FIG. 2) which are progressed from a supply stack 70, by means of a conveyor 71, to a forming station 72 whereat is arranged flexible jig means which form side walls as 31, 32. From thence said backing sheets 30 move to the main stream D for handling as before described.

The stream C is adapted to prepare and feed sheets as 50 (FIG. 3) of asbestos felt material from a supply of material 80 in coil form. A conveyor 81 moves the material through a forming station 82 at which side walls as 51, 52 (FIG. 3) are formed. The thus formed material is then progressed via the conveyor means 81 to a guillotine 83 which cuts same to required length, and the thus formed sheets are then passed to the main stream D for completion of the manufacturing process.

It will be seen that the invention provides relatively simple and effective means whereby the manufacture of composite building sheets or panels as referred to may be expedited and the cost of manufacture thereby considerably reduced.

It is to be particularly noted that the association of a first sheet with a second sheet subsequent to the deposition of the plastics composition on the first sheet, and the provision of pressure relieving means, enables the jig or clamp or other confining means to be of much lighter, and simpler, and therefore much less expensive construction, than heretofore has been possible. Further the core material may be less dense than heretofore has been practicable employing conventional injection methods.

It is of course to be understood that sheets of material other than those hereinbefore referred to, and of profiles or shapes or configuration other than those illustrated, may be employed without departing from the scope of the invention.

What is claimed is:

1. The method of preparing a foam-filled building construction panel which comprises:
   applying a coating of foaming plastics composition to the top surface of a first panel sheet;
   delivering the coated first panel sheet with the said plastics composition actively foaming to a panel assembly station;
   securing a second panel sheet to the said first panel sheet in fixed juxtaposed relation therewith and with the said foaming plastics composition between the two panel sheets and whilst the said plastic composition is actively foaming; and
   retaining the said two panel sheets in juxtaposition until the said plastics composition engages the said second sheet and essentially ceases its active foaming, whereby the two panel sheets become firmly bonded by the foamed plastics composition;
   the said second panel sheet being profiled so as to provide at least one expansion space; and
   the said foaming plastics composition being applied to the said first panel sheet in an amount which is less than the amount required to fill all of the space between the inner surfaces of the two panel sheets, whereby the inner surface of the said second panel sheet engages the foamed plastics composition over its entire area except for a portion of that inner surface of the said second panel sheet which defines the said expansion space.

References Cited

UNITED STATES PATENTS

| | | | |
|---|---|---|---|
| 3,231,439 | 1/1966 | Voelker | 156—79 |
| 3,258,889 | 7/1966 | Butcher | 52—309 |

HENRY C. SUTHERLAND, Primary Examiner

U.S. Cl. X.R.

52—309, 573, 615; 156—290